United States Patent
Seong et al.

(10) Patent No.: US 11,258,057 B2
(45) Date of Patent: Feb. 22, 2022

(54) SOLID ELECTROLYTE FOR ALL-SOLID BATTERY HAVING ARGYRODITE-TYPE CRYSTAL STRUCTURE DERIVED FROM SINGLE ELEMENT AND METHOD OF PREPARING THE SAME

(71) Applicants: Hyundai Motor Company, Seoul (KR); Kia Motors Corporation, Seoul (KR)

(72) Inventors: Ju Yeong Seong, Gyeonggi-do (KR); Yong Jun Jang, Gyeonggi-do (KR); Pil Gun Oh, Seoul (KR); Yong Sub Yoon, Seoul (KR); Jae Min Lim, Gyeonggi-do (KR); Sa Heum Kim, Gyeonggi-do (KR); Hong Seok Min, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 60 days.

(21) Appl. No.: 16/180,240

(22) Filed: Nov. 5, 2018

(65) Prior Publication Data

US 2019/0190007 A1    Jun. 20, 2019

(30) Foreign Application Priority Data

Dec. 20, 2017 (KR) .......................... 10-2017-0175875

(51) Int. Cl.
*H01M 10/0569* (2010.01)
*H01M 4/136* (2010.01)
*H01M 4/36* (2006.01)
*H01M 4/58* (2010.01)
*H01M 4/38* (2006.01)
(Continued)

(52) U.S. Cl.
CPC ............ *H01M 4/136* (2013.01); *C01B 17/22* (2013.01); *H01M 4/0471* (2013.01); *H01M 4/364* (2013.01); *H01M 4/388* (2013.01); *H01M 4/5815* (2013.01); *H01M 10/052* (2013.01); *H01M 10/0525* (2013.01); *H01M 10/0562* (2013.01); *H01M 10/0569* (2013.01);
(Continued)

(58) Field of Classification Search
None
See application file for complete search history.

(56) References Cited

U.S. PATENT DOCUMENTS

2005/0107239 A1* 5/2005 Akiba ............... C03C 3/321
501/40
2015/0162614 A1* 6/2015 Koshika ............. H01M 4/13
429/189
(Continued)

FOREIGN PATENT DOCUMENTS

KR    20120095987 A    8/2012

OTHER PUBLICATIONS

Rao et al. Phys. Status Solidi A 208, No. 8, 1804-1807 (2011) (Year: 2011).*
(Continued)

*Primary Examiner* — Victoria H Lynch
(74) *Attorney, Agent, or Firm* — Mintz Levin Cohn Ferris Glovsky and Popeo, P.C.; Peter F. Corless

(57) ABSTRACT

Disclosed is a solid electrolyte for an all-solid battery and a method of preparing the same. Particularly, the solid electrolyte may have an argyrodite-type crystal structure.

9 Claims, 3 Drawing Sheets

(51) Int. Cl.
     *H01M 10/0525*   (2010.01)
     *H01M 4/04*      (2006.01)
     *C01B 17/22*     (2006.01)
     *H01M 10/0562*   (2010.01)
     *H01M 10/052*    (2010.01)

(52) U.S. Cl.
     CPC ... *C01P 2002/72* (2013.01); *H01M 2300/004* (2013.01); *H01M 2300/0091* (2013.01)

(56) References Cited

U.S. PATENT DOCUMENTS

| | | | |
|---|---|---|---|
| 2018/0069262 A1* | 3/2018 | Utsuno | H01M 10/0525 |
| 2018/0155198 A1* | 6/2018 | Sato | B01J 19/20 |
| 2020/0220207 A1* | 7/2020 | Sato | H01M 4/5815 |

OTHER PUBLICATIONS

S. Yubuchi et al., "Preparation of high lithium-ion conducting Li6PS5Cl solid electrolyte from ethanol solution for all solid-state lithium batteries", Journal of Power Sources, vol. 293, pp. 941-945 (2015).
R.P. Rao et al., "Studies of lithium argyrodite solid electrolytes for all-solid-state batteries", Phys. Status Solidi, v208 (8), pp. 1804-1807(2011).
H.J. Deiseroth et al., "Li6PS5X: A Class of Crystalline Li-Rich Solids With an Unusually High Li Mobililty", Angew. Chem. Int. Ed., vol. 47, pp. 755-758 (2008).

\* cited by examiner

SOLID ELECTROLYTE FOR ALL-SOLID BATTERY HAVING ARGYRODITE-TYPE CRYSTAL STRUCTURE DERIVED FROM SINGLE ELEMENT AND METHOD OF PREPARING THE SAME

CROSS-REFERENCE TO RELATED APPLICATION

This application claims, under 35 U.S.C. § 119(a), the benefit of priority to Korean Patent Application No. 10-2017-0175875 filed on Dec. 20, 2017, the entire contents of which are incorporated herein by reference.

TECHNICAL FIELD

The present invention relates to a solid electrolyte for an all-solid battery and to a method of preparing the same. The solid electrolyte may have an argyrodite-type crystal structure.

BACKGROUND OF THE INVENTION

Secondary batteries have been widely used in large-sized devices, such as vehicles and electric power storage systems, and in small-sized devices, such as mobile phones, camcorders, laptop computers, and the like.

As the fields of application of secondary batteries have broadened, there is growing demand for improved safety and performance of batteries. For example, a lithium secondary battery has high energy density and large capacity per unit area compared to a nickel-manganese battery or a nickel-cadmium battery.

However, most of the electrolytes used in conventional lithium secondary batteries are liquid electrolytes including organic solvents. Hence, safety problems such as leakage of electrolytes and the risk of fire resulting therefrom have been constantly raised.

In recent years, attention has been paid to an all-solid battery using a solid electrolyte as an electrolyte, instead of a liquid electrolyte, in order to enhance safety. Since the solid electrolyte is non-combustible or flame retardant, the solid electrolyte can be safer than the liquid electrolyte.

The solid electrolyte may include an oxide-based solid electrolyte and a sulfide-based solid electrolyte. The sulfide-based solid electrolyte may be advantageous in that it has high lithium ion conductivity and may be stable across a wide voltage range compared to an oxide-based solid electrolyte.

For example, in the related arts, a sulfide-based solid electrolyte has been prepared by subjecting $Li_2S$ and $P_2S_5$ to mixing and vitrification. Conventionally, a sulfide-based solid electrolyte has been prepared using a starting material in the form of a compound as mentioned above. The starting material in compound form such as $Li_2S$ is about 5 million won/kg, and thus the material cost thereof is very high. Moreover, in recent years, attempts have been made to improve a sulfide-based solid electrolyte by mixing a compound such as $GeS_2$ with $Li_2S$ and $P_2S_5$, whereby material costs are further increased. High material costs are an obstacle to increasing the area of a battery in response to the demand for high-capacity energy storage technology.

SUMMARY OF THE INVENTION

In preferred aspects, the present invention provides a solid electrolyte and a method of preparing the same. Preferably, starting materials for preparing the solid electrolyte may include one or more single elements, rather than a compound. The term "single elements" as used here refers to a material consisting of one type or single type of element such as sulfur, phosphorus and the like. For example, the single element material for sulfur consists of only S atoms, which may form in various different chemical formulae such as $S_6$, $S_7$, $S_8$, $S_{12}$, and the like. The single element material for phosphorus consists of only P atoms, which may forms in various different chemical formulae such as $P_2$, $P_4$, and the like.

Accordingly, the solid electrolyte of the present invention may have an argyrodite-type crystal structure with high lithium ion conductivity.

Moreover, the solid electrolyte may facilitates an increase in the area of a battery.

The aspects of the present invention are not limited to the foregoing, and will be able to be clearly understood through the following description and to be realized by the means described in the claims and combinations thereof.

In one aspect of the present invention, provided is a solid electrolyte for an all-solid battery that may include sulfur (S) element derived from an elemental sulfur powder, a phosphorus (P) element derived from an elemental phosphorus powder, a lithium (Li) element derived from an elemental lithium powder, and a halogen element derived from a halogen compound powder. Preferably, the solid electrolyte may have an argyrodite-type crystal structure.

The term "all-solid cell" or "all-solid battery" as used herein refers to a cell or a battery that includes only solid or substantially solid-state components, such as solid state electrodes (e.g. anode and cathode) and solid electrolyte. Thus, in preferred aspect, an all-solid cell will not include a fluid and/or flowable electrolyte component as a material or component.

The term "argyrodite crystal", "argyrodite crystal system" or "argyrodite-type crystal" as used herein refers to a crystal structure having a crystal structure or system similar to naturally existing $Ag_8GeS_6$ (Argyrodite). The argyrodite crystal may be orthorhombic having $Pna2_1$ space group and having a unit cell of a=15.149, b=7.476, c=10.589 [Å]; Z=4. The argyrodite crystal also may empirically be determined for example, by X-ray diffraction spectroscopy by observing peaks around at 2θ=15.5±1°, 18±1°, 26±1°, 30.5±1°, and 32±1°.

The halogen element of the solid electrolyte discussed above may include bromine (Br), chlorine (Cl), iodine (I) or combinations thereof.

The solid electrolyte may suitably have an argyrodite-type crystal structure, as represented by Chemical Formula 1:

  [Chemical Formula 1]

wherein X is Cl, Br or I.

For example, the solid electrolyte may suitably have an argyrodite-type crystal structure, as represented by Chemical Formula 2:

  [Chemical Formula 2]

In another aspect, provided is a method of preparing the solid electrolyte. The method may include providing a powder mixture comprising an elemental sulfur powder, an elemental phosphorus powder, an elemental lithium powder and a halogen compound powder, amorphizing the powder mixture, and heat treating the amorphized powder mixture.

The term "halogen compound" as used herein refers to a compound including one or more of halogen atoms such as F, Cl, Br, or I via chemical bond (e.g., ionic bond or covalent bond) to the other atoms constituting the compound. In certain preferred aspect, the halogen compound may include one or more of F, Cl, Br, I, or combinations thereof and one or more metal atoms. In other preferred aspect, the halogen compound may include one or more of F, Cl, Br, I, or combinations thereof and one or more non-metal atoms. Non-limiting examples may suitably include metal halide such as LiF, LiBr, LiCl, LiI, NaF, NaBr, NaCl, NaI, KaF, KBr, KCl, KI, and the like. In certain preferred aspect, the halogen compound suitably for the use in a solid electrolyte in all-solid Li-ion battery may include one or more halogen atoms and Li.

Preferably, the amorphized powder mixture may be crystalized by the heat treating.

The halogen compound may include lithium bromide (LiBr), lithium chloride (LiCl), lithium iodide (LiI) or combinations thereof.

The powder mixture may include an elemental sulfur powder, an elemental phosphorus powder, an elemental lithium powder and a halogen compound powder.

The amorphizing may suitably be performed by milling. The amorphizing may be performed by adding the powder mixture to a solvent and then milling using a planetary mill at about 300 RPM to 1000 RPM for about 4 hr to 40 hr.

The solvent may include: i) at least one hydrocarbon-based solvent; at least one BTX-based solvent; iii) at least one ether-based solvent; iv) at least one ester-based solvent; or combinations thereof.

The solvent may suitably include: i) at least one selected from among pentane, hexane, 2-ethyl hexane, heptane, octane, cyclohexane and methyl cyclohexane; at least one from among benzene, toluene, xylene and ethylbenzene; at least one selected from among diethyl ether, tetrahydrofuran and 1,4-dioxane; iv) at least one ester-based solvent selected from among ethyl propionate and propyl propionate; or combinations thereof.

The heat treating may be performed at a temperature of about 200° C. to 550° C. for about 1 min to 100 hr. The solid electrolyte obtained by the method described herein may have an argyrodite-type crystal structure, as represented by Chemical Formula 1:

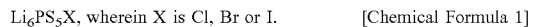

$Li_6PS_5X$, wherein X is Cl, Br or I.     [Chemical Formula 1]

The solid electrolyte obtained by the method described herein may have an argyrodite-type crystal structure, as represented by Chemical Formula 2:

$Li_6PS_5Cl$     [Chemical Formula 2]

Further provided is an all-solid battery including the solid electrolyte as described herein.

Still further provided herein is a vehicle including the all-solid battery as described herein.

According to the present invention, the solid electrolyte may have improved lithium ion conductivity and discharge capacity as being used in an all-solid battery and may be provided at a reduced cost by about 5% of the cost of conventional techniques.

Further, the present invention may provide incentives for the development of a solid electrolyte derived from single elements, in which the composition thereof can be easily changed and the proportions of elements such as lithium, phosphorus, sulfur and the like can be varied.

Other aspects of the invention are disclosed infra.

Moreover, the solid electrolyte of the present invention may be safely and inexpensively prepared without the need for a special device such as a glove box.

The effects of the present invention are not limited to the foregoing. The effects of the present invention should be understood to include all reasonably possible effects in the following description.

DESCRIPTION OF SPECIFIC EMBODIMENTS

Figure 1:
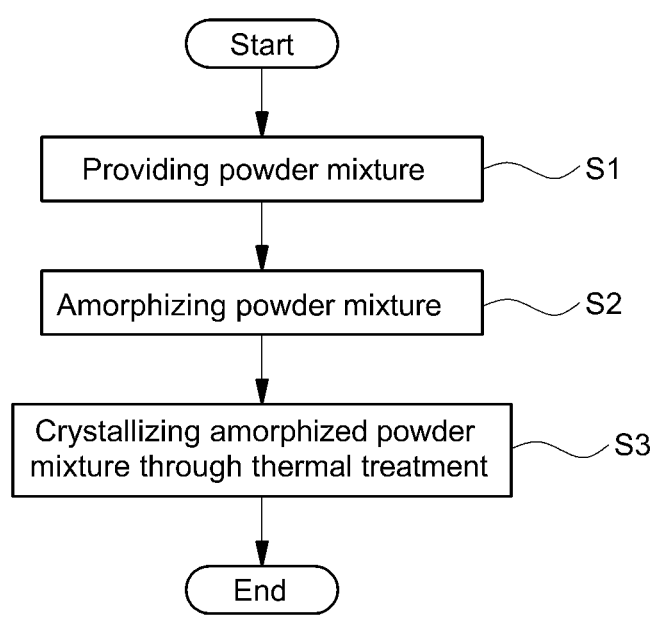
FIG. 1 schematically shows an exemplary process of preparing an exemplary solid electrolyte for an exemplary all-solid battery having an argyrodite-type crystal structure according to an exemplary embodiment of the present invention.

The above and other aspects, features and advantages of the present invention will be more clearly understood from the following preferred embodiments taken in conjunction with the accompanying drawings. However, the present invention is not limited to the embodiments disclosed herein, but may be modified into different forms. These embodiments are provided to thoroughly explain the invention and to sufficiently transfer the spirit of the present invention to those skilled in the art.

Throughout the drawings, the same reference numerals will refer to the same or like elements. For the sake of clarity of the present invention, the dimensions of structures are depicted as being larger than the actual sizes thereof. It will be understood that, although terms such as "first", "second", etc. may be used herein to describe various elements, these elements are not to be limited by these terms. These terms are only used to distinguish one element from another element. For instance, a first element discussed below could be termed a second element without departing from the scope of the present invention. Similarly, the second element could also be termed a first element. As used herein, the singular forms are intended to include the plural forms as well, unless the context clearly indicates otherwise.

It will be further understood that the terms "comprise", "include", "have", etc. when used in this specification specify the presence of stated features, integers, steps, operations, elements, components, or combinations thereof, but do not preclude the presence or addition of one or more other features, integers, steps, operations, elements, components, or combinations thereof. Also, it will be understood that when an element such as a layer, film, area, or sheet is referred to as being "on" another element, it can be directly on the other element, or intervening elements may be present therebetween. In contrast, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are taken to mean that these numbers are approximations including various uncertainties of the measurements that essentially occur in obtaining these values among others, and thus should be understood to be modified by the term "about" in all cases. Furthermore, when a numerical range is disclosed in this specification, such a range is continuous and includes all values from the minimum value of said range to the maximum value thereof, unless otherwise indicated. Moreover, when such a range refers to an integer, all integers including the minimum value to the maximum value are included unless otherwise indicated.

In the present specification, when a range is described for a variable, it will be understood that the variable includes all values including the end points described within the stated range. For example, the range of "5 to 10" will be understood to include any subranges, such as 6 to 10, 7 to 10, 6 to 9, 7 to 9, and the like, as well as individual values of 5, 6, 7, 8, 9 and 10, and will also be understood to include any value between the valid integers within the stated range, such as 5.5, 6.5, 7.5, 5.5 to 8.5, 6.5 to 9, and the like. Also, for example, the range of "10% to 30%" will be understood to include any subranges, such as 10% to 15%, 12% to 18%, 20% to 30%, etc., as well as all integers including values of 10%, 11%, 12%, 13% and the like and up to 30%, and will also be understood to include any value between the valid integers within the stated range, such as 10.5%, 15.5%, 25.5%, and the like.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In one aspect, a solid electrolyte for an all-solid battery may include sulfur (S); a phosphorus (P); lithium (Li); and halogen and may have an argyrodite-type crystal structure. Preferably, the solid electrolyte may include a sulfur (S) element derived from an elemental sulfur powder, a phosphorus (P) element derived from an elemental phosphorus powder, a lithium (Li) element derived from an elemental lithium powder, and a halogen element (X) derived from a halogen compound powder.

As used herein, the term "elemental" refers to a single substance that consists of a single element and thus exhibits unique chemical properties. Thus, the elemental sulfur powder indicates a powder of elemental sulfur consisting of a sulfur (S) element to thus exhibit unique chemical properties, the elemental phosphorus powder indicates a powder of elemental phosphorus consisting of a phosphorus (P) element to thus exhibit unique chemical properties, and the elemental lithium powder indicates a powder of elemental lithium consisting of a lithium (Li) element to thus exhibit unique chemical properties.

Here, the term "halogen compound" refers to a compound containing a halogen element.

In the related arts, when preparing a solid electrolyte such as $Li_3PS_4$, a starting material comprising $Li_2S$ and $P_2S_5$ mixed at a mol % ratio of 75:25 was conventionally used. When the starting material in compound form is used as in the conventional case, the material costs are remarkably high. For example, the above starting material ($75Li_2S$-$25P_2S_5$) has a price of about 5 million won/kg. In addition, $Li_2S$ is sensitive to water and $P_2S_5$ is a compound having a high risk of explosion in an ambient atmosphere, and thus these have to be handled in a glove box, which is undesirable.

The present invention has been made keeping in mind the problems and limitations as above, and addresses a solid electrolyte, which may be obtained from an elemental sulfur powder, an elemental phosphorus powder, an elemental lithium powder and a halogen compound powder, suitable for the composition of a desired solid electrolyte.

In the present invention, the starting material may include an elemental sulfur powder, an elemental phosphorus powder, an elemental lithium powder, and the like, and the price thereof is about 150 thousand won/kg, whereby the production cost of a solid electrolyte may be substantially reduced compared to when using the powder in compound form. According to the present invention, a solid electrolyte having superior lithium ion conductivity and discharge capacity (when used for an all-solid battery) may be obtained at the reduced cost.

Moreover, because the starting materials in a compound forms (e.g., $Li_2S$ and $P_2S_5$), which are harmful to human bodies and are sensitive to water or entails the risk of explosion, are not used, the need for an additional device, such as a glove box, may be obviated, and the solid electrolyte may be safely obtained.

The halogen compound may include lithium bromide (LiBr), lithium chloride (LiCl), lithium iodide (LiI) or combinations thereof. The halogen element (X) may include a bromine (Br) element, a chlorine (Cl) element, an iodine (I) element and combinations thereof.

The solid electrolyte has an argyrodite-type crystal structure and may be represented by Chemical Formula 1 below.

$Li_6PS_5X$                          [Chemical Formula 1]

In Chemical Formula 1, X is Cl, Br or I.

FIG. 1 shows the process of preparing the solid electrolyte for an all-solid battery having an argyrodite-type crystal structure according to the present invention. With reference thereto, the preparation method of the invention may include providing a powder mixture comprising an elemental sulfur powder, an elemental phosphorus powder, an elemental lithium powder and a halogen compound powder (S1), amorphizing the powder mixture (S2), and heat treating the amorphized powder mixture (S3). The powder mixture may be suitably amorphized by milling. The amorphized powder mixture may be crystallized by the heat treating.

Providing the powder mixture (S1) may include weighing and mixing the elemental sulfur powder, the elemental phosphorus powder, the elemental lithium powder and the halogen compound powder so as to be suitable for the composition of a desired solid electrolyte.

The elemental lithium powder may be replaced with a single material containing lithium metal. As the single material, any material may be used, so long as it is not in compound form and may be mixed and amorphized with the elemental sulfur powder, the elemental phosphorus powder, and the like, through milling. For example, it may be lithium foil.

The halogen compound may include lithium bromide (LiBr), lithium chloride (LiCl), lithium iodide (LiI) or combinations thereof.

The powder mixture may be amorphized through milling (S2).

The amorphization (S2) may be performed through wet milling or dry milling, and may be preferably carried out through wet milling in order to uniformly form and grow crystals in the subsequent thermal treatment step (S3).

Particularly, the amorphization may be carried out by adding the powder mixture to a solvent and subsequently milling at about 300 RPM to 1,000 RPM for about 4 hr to 40 hr using a planetary mill.

The solvent may include i) at least one hydrocarbon-based solvent selected from among pentane, hexane, 2-ethyl hexane, heptane, octane, cyclohexane and methyl cyclohexane; at least one BTX-based solvent selected from among benzene, toluene, xylene and ethylbenzene; at least one ether-based solvent selected from among diethyl ether, tetrahydrofuran and 1,4-dioxane; iv) at least one ester-based solvent selected from among ethyl propionate and propyl propionate; or combinations thereof For instance, an amount of about 1 wt % to 50 wt % of the powder mixture and an amount of about 50 wt % to 99 wt % of the solvent, based on the total weight of the powder mixture and the solvent, may be mixed. Preferably, an amount of about 4 wt % to 20 wt % of the powder mixture and an amount of 80 wt %-96 wt % of the solvent, based on the total weight of the powder mixture and the solvent, may be mixed. Particularly, an amount of about 5 wt % to 15 wt % of the powder mixture and an amount of about 75 wt % to 95 wt % of the solvent, based on the total weight of the powder mixture and the solvent, may be mixed. When the amount of the powder mixture is less than about 1 wt %, the yield of the amorphization may be decreased thus unsuitable for mass production. On the other hand, when the amount of the powder mixture is greater than about 50 wt %, it may be difficult to obtain a uniformly amorphized material as in dry milling.

The amorphized powder mixture may suitably be crystallized through thermal treatment (S3).

The crystallization (S3) may be performed through thermal treatment of the amorphized powder mixture at a temperature of about 200° C. to 550° C. for about 1 min to 100 hr, for about 1 hr to 100 hr, or particularly for 4 hr to 100 hr.

Before the crystallization (S3), drying the amorphized powder mixture may be further performed. This drying process may be conducted in order to remove the solvent remaining in the amorphized powder mixture, and may include vacuum drying at room temperature to about 200° C. for about 1 min to 10 hr, thermal drying, or thermal drying in a vacuum.

In the present invention, since the powder mixture obtained from the elemental sulfur, elemental phosphorus, elemental lithium, and halogen compound powder is used as the starting material, the processing may not be performed in a glove box, unlike the use of lithium sulfide ($Li_2S$), phosphorus pentasulfide ($P_2S_5$), etc., and may be simply performed in a dry room.

The solid electrolyte prepared by the above method may have an argyrodite-type crystal structure, and may be represented by Chemical Formula 1 below.

$Li_6PS_5X$  [Chemical Formula 1]

In Chemical Formula 1, X is Cl, Br or I.

A better understanding of the present invention will be given through the following examples and test examples, which are merely set forth to illustrate, but are not to be construed as limiting the present invention.

EXAMPLE

Examples (S1) A powder mixture was obtained by mixing an elemental sulfur powder (made by Sigma Aldrich, sulfur), an elemental phosphorus powder (made by Sigma Aldrich, phosphorus), an elemental lithium powder (made by FMC, lithium powder) and a lithium chloride powder (made by Sigma Aldrich, LiCl). Specifically, 11.9 g of an elemental sulfur powder, 2.3 g of an elemental phosphorus powder, 2.6 g of an elemental lithium powder and 3.1 g of lithium chloride were weighed and mixed, thus obtaining a powder mixture. The molar ratio of the raw materials was Li:P:S:LiCl=5:1:5:1.

(S2) The powder mixture was mixed with 165 g of a xylene solvent and then placed in a planetary ball mill together with 1150 g of zirconia balls. Thereafter, milling was performed at about 360 RPM, whereby the powder mixture was amorphized.

(S3) The amorphized powder mixture was crystallized through thermal treatment at a temperature of about 500° C. for 4 hr, thereby yielding a solid electrolyte having an argyrodite-type crystal structure, as represented by Chemical Formula 2 below.

$Li_6PS_5Cl$  [Chemical Formula 2]

Preparation Example—Manufacture of all-Solid Battery

An all-solid battery, configured to include the solid electrolyte of Example and to include a cathode, an anode, and a solid electrolyte layer disposed between the cathode and the anode, was manufactured.

(Solid electrolyte layer) A solid electrolyte layer having a thickness of 500 μm was formed by subjecting the solid electrolyte of Example to compression molding.

(Cathode) A cathode having a thickness of 30 μm was formed on one side of the solid electrolyte layer using a powder comprising an active material (lithium nickel cobalt manganese-based active material, NCM-711), the solid electrolyte of Example and a conductive additive (Super C), which were mixed together. The amount of loaded active material for the cathode was 5.8 mg/cm².

(Anode) An anode was formed by attaching a piece of lithium foil having a thickness of 100 μm to the remaining side of the solid electrolyte layer.

Comparative Example

As the starting material, compounds ($Li_2S$, $P_2S_5$, LiCl) were used in lieu of the simple substances.

$Li_2S$, $P_2S_5$ and LiCl were weighed and mixed so as to be suitable for the composition of $Li_6PS_5Cl$. The mixture was subjected to dry milling and was then thermally treated at a temperature of 500° C. for 4 hr, thus obtaining a solid electrolyte.

An all-solid battery was manufactured in the same manner as in Preparation Example, with the exception that the above solid electrolyte was used.

Test Example 1—X-Ray Diffraction Spectroscopy of Solid Electrolyte

Figure 2:
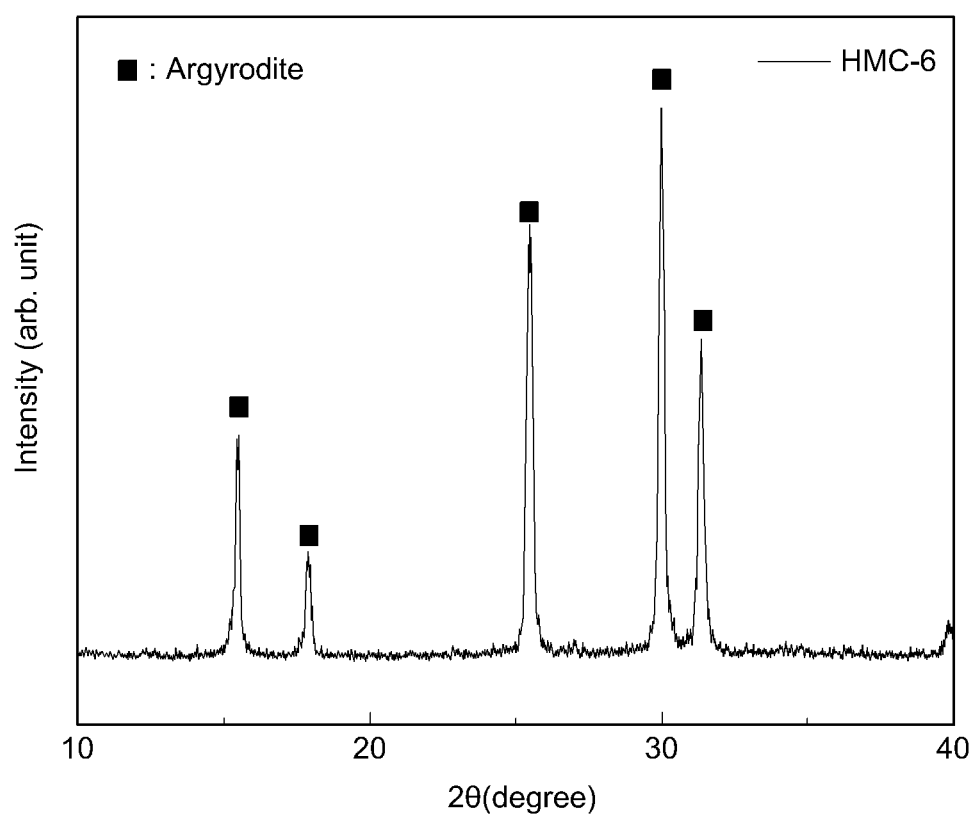
FIG. 2 shows the results of X-ray diffraction spectroscopy of an exemplary solid electrolyte prepared in Example according to an exemplary embodiment of the present invention.

The solid electrolyte prepared in Example was subjected to X-ray diffraction spectroscopy. The results are shown in FIG. 2. With reference thereto, main peaks were observed at $2\theta=15.5\pm1°$, $18\pm1°$, $26\pm1°$, $30.5\pm1°$, and $32\pm1°$, all of which matched the peaks of argyrodite-type crystal structure, from which the solid electrolyte was determined to have an argyrodite-type crystal structure.

Test Example 2—Measurement of Lithium Ion Conductivity of Solid Electrolyte

The solid electrolyte prepared in Example was subjected to compression molding to thus produce a molded measurement body (diameter of 13 mm, thickness of 0.6 mm). AC potential of 10 mV was applied to the molded body, and impedance was measured at a frequency sweep of $1\times10^6$ to 100 Hz, and thus the lithium ion conductivity of the solid electrolyte was found to be very high, specifically $2.0\times10^{-3}$ S/cm. Therefore, according to the preparation method of the present invention, a solid electrolyte can have high ion conductivity.

Test Example 3—Measurement of Discharge Capacity of all-Solid Batteries

Figure 3:
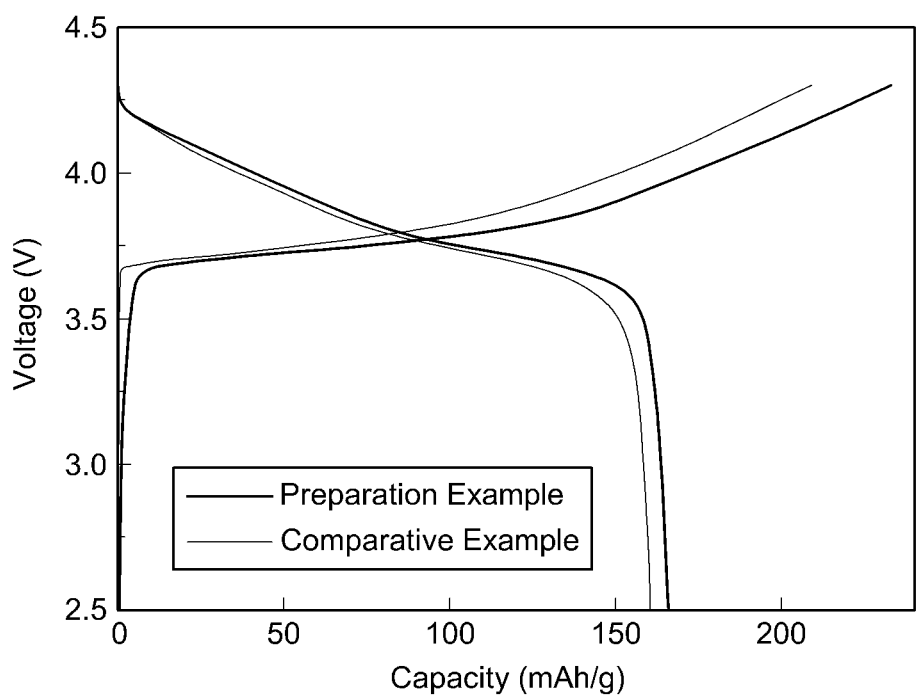
FIG. 3 shows the results of measurement of charge capacity and discharge capacity through charge-discharge testing of the all-solid batteries of Preparation Example and Comparative Example according to the present invention.

The all-solid batteries of Preparation Example and Comparative Example were subjected to charge-discharge testing at a rate of 0.1 C under conditions of CC (constant current) of 2.5 V-4.3 V to thus measure the charge capacity and discharge capacity thereof. The results are shown in FIG. 3. With reference thereto, the results of charge capacity, discharge capacity and efficiency of the all-solid batteries of Preparation Example and Comparative Example are as shown in Table 1 below.

TABLE 1

| No. | Charge capacity [mAh/g] | Discharge capacity [mAh/g] | Efficiency [%] |
|---|---|---|---|
| Preparation Example (Present invention) | 232.5 | 165.9 | 71.4 |
| Comparative Example | 208.7 | 160.6 | 77.0 |

Although various exemplary embodiments of the present invention have been described with reference to the accompanying drawings, those skilled in the art will appreciate that the present invention may be embodied in other specific forms without changing the technical spirit or essential features. Thus, embodiments described above should be understood to be illustrative in every way and non-limiting.

What is claimed is:

1. A method of preparing a solid electrolyte for an all-solid battery, comprising:
providing a powder mixture consisting of an elemental sulfur powder, an elemental phosphorus powder, an elemental lithium powder and a halogen compound powder;
amorphizing the powder mixture; and
heat treating the amorphized powder mixture,
wherein the solid electrolyte comprises an argyrodite-type crystal structure, and
the amorphizing is performed in a dry room.

2. The method of claim 1, wherein the amorphized powder mixture is crystalized by the heat treating.

3. The method of claim 1, wherein the halogen compound is selected from the group consisting of lithium bromide (LiBr), lithium chloride (LiCl), lithium iodide (LiI) and combinations thereof.

4. The method of claim 1, wherein the amorphizing is performed by milling.

5. The method of claim 4, wherein the amorphizing is performed by adding the powder mixture to a solvent and then milling using a planetary mill at about 300 RPM to 1000 RPM for about 4 hr to 40 hr.

6. The method of claim 5, wherein the solvent comprises:
at least one hydrocarbon-based solvent selected from among pentane, hexane, 2-ethyl hexane, heptane, octane, cyclohexane or methyl cyclohexane;
at least one selected from among benzene, toluene, xylene or ethylbenzene;
at least one selected from among diethyl ether, tetrahydrofuran or 1,4-dioxane; and
at least one selected from among ethyl propionate or propyl propionate.

7. The method of claim 1, wherein the heat treating is performed at a temperature of about 200° C. to 550° C. for about 1 min to 100 hr.

8. The method of claim 1, wherein the solid electrolyte has an argyrodite-type crystal structure, as represented by Chemical Formula 1:

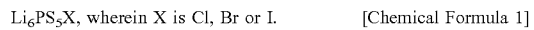

$Li_6PS_5X$, wherein X is Cl, Br or I.     [Chemical Formula 1]

9. The method of claim 1, wherein the solid electrolyte has an argyrodite-type crystal structure, as represented by Chemical Formula 2:

$Li_6PS_5Cl$.     [Chemical Formula 2]

* * * * *